United States Patent [19]

Raidel, Jr.

[11] E Patent Number: Re. 32,486

[45] Reissued Date of Patent: Sep. 1, 1987

[54] VEHICLE SUSPENSION WITH RIGID TORQUE BEAM

[76] Inventor: John E. Raidel, Jr., 2924 South Chantilly, Springfield, Mo. 65808

[21] Appl. No.: 752,830

[22] Filed: Jul. 8, 1987

Related U.S. Patent Documents

Reissue of:

[64] Patent No.: 4,427,213
Issued: Jan. 24, 1984
Appl. No.: 341,445
Filed: Jan. 21, 1982

[51] Int. Cl.[4] ..... B60K 23/00

[52] U.S. Cl. ..... 280/711; 267/27

[58] Field of Search ..... 280/711, 712, 713, 709; 267/67

[56] References Cited

U.S. PATENT DOCUMENTS

| | | | |
|---|---|---|---|
| 2,814,480 | 11/1957 | Clark et al. | 280/711 |
| 3,482,854 | 12/1969 | Masser | 280/713 |
| 3,801,086 | 4/1974 | Raidel | 280/713 |
| 4,166,639 | 9/1979 | Taylor | 280/711 |
| 4,181,323 | 1/1980 | Raidel | 280/711 |
| 4,309,045 | 1/1982 | Raidel | 280/711 |

FOREIGN PATENT DOCUMENTS

| | | | |
|---|---|---|---|
| 302468 | 10/1965 | Netherlands | 280/711 |

*Primary Examiner*—Richard A. Bertsch
*Attorney, Agent, or Firm*—Rogers, Howell, Moore & Haferkamp

[57] ABSTRACT

A vehicle suspension of a type generally disclosed in U.S. Pat. No. 3,801,086, especially adapted to drop-frame vehicles, wherein a torque beam is formed to straddle the frame of the vehicle and be attached through a resilient bushing to the web of the frame, all of which gives a controlled spring to the vehicle as well as an accommodation for the tilting of the axle about a longitudinal axis of the vehicle.

16 Claims, 6 Drawing Figures

FIG. 2.
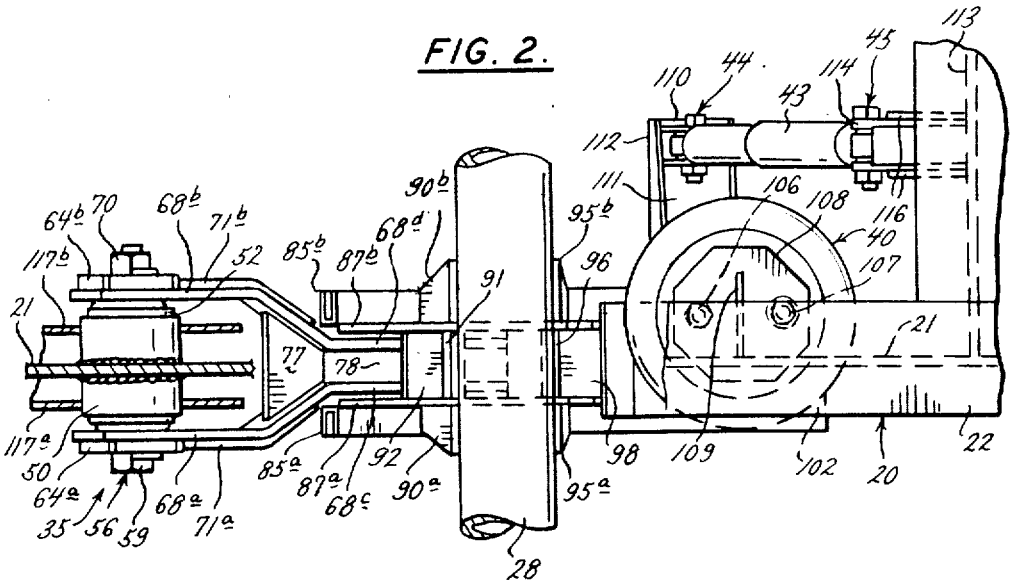
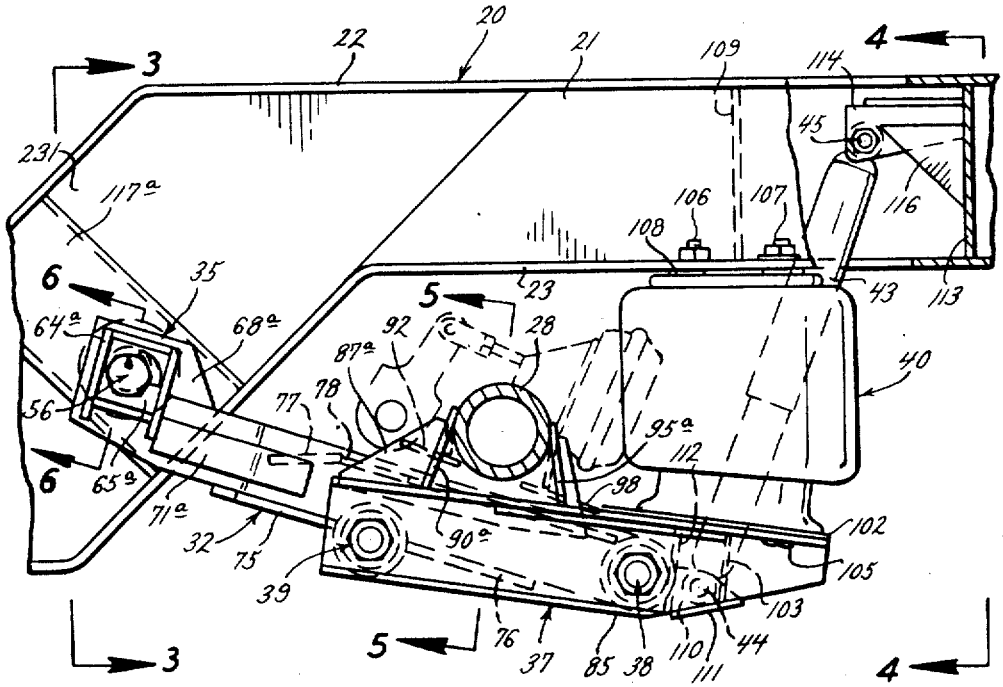
FIG. 1.

VEHICLE SUSPENSION WITH RIGID TORQUE BEAM

Matter enclosed in heavy brackets [ ] appears in the original patent but forms no part of this reissue specification; matter printed in italics indicates the additions made by reissue.

BACKGROUND AND OBJECTS OF THE INVENTION

In the construction heretofore built of this type, the Raidel U.S. Pat. No. 3,801,086 represents one in which a special hanger mounting is provided for attachment to the vehicle frame, to accommodate the bushing attaching the end of the torque beam to the vehicle. It is an object of the present invention to design the torque beam so that it can be attached directly to a frame of the vehicle, such as could be found in a drop frame trailer.

In the prior art there has been a resilient bushing connecting the torque beam to the hanger and that bushing had its outer cylinder connected to or forming a part of the torque beam itself. In the present invention, that outer cylinder of the resilient bushing is permanently welded to the frame of the vehicle. In the former structure, the hanger bracket came down in two sections on the opposite ends of the bushing. In the present arrangement, there is a single primary connection in the form of the attachment of the outer cylindrical sleeve of the bushing to the web of the frame of the vehicle, and two arms of the torque beam are connected to the pivot of the bushing at opposite ends of the pivot and are non-rotatably secured thereto. These two ends of the torque beam in the present disclosure thus are separated so as to straddle the flange on the frame of the vehicle, but they are then tapered toward each other so that they can fit between the two side arms of the lower or buffer beam. An object of the invention is a suspension of the foregoing type that can accommodate differences in elevation between opposite ends of the axle. Another object is a suspension having the foregoing advantages, wherein there is a fore-and-aft adjustment of each suspension to insure wheel alignment and to provide a suspension of this type wherein the torque beam and its attachment to the frame may have the foregoing features enabling this type of suspension to be mounted directly on the vehicle frame. A further object of the present invention is to design the foregoing parts so that they can be largely pre-assembled readily and then mounted onto the vehicle.

Thus, the objects of the present invention are to provide a suspension assembly of this type that can be used with drop frame vehicles and that is strong, that is easy to assemble, and yet that achieves the comfortable ride and the accommodation of the different movements of the axle relative to the frame.

In the drawings:

FIG. 1 is a side elevation of a portion of the vehicle frame to which the present invention is mounted;

FIG. 2 is a top view of the construction of FIG. 1;

DETAILED DESCRIPTION OF PREFERRED EMBODIMENT

Figure 3:
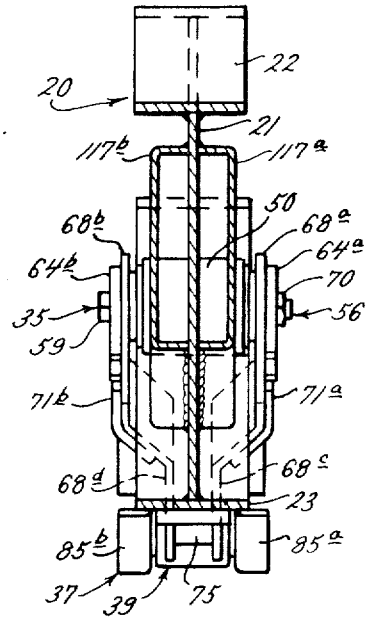
FIG. 3 is an end view taken from the left end on the line 3—3 of FIG. 1.

FIG. 1 shows a drop frame 20 in the form of an I-beam with a web 21 and flanges 22 and 23. As shown at the left of FIG. 1, it drops down between the axles by way of a downwardly-sloping portion 231 to a lower level.

It will be understood that the present mechanism, while illustrated for the left rear wheel, is representative of the other three similar assemblies that may be applied to the other wheels, both on the left and right sides. The right side assemblies are in certain portions, mirror images of the left side, and the forward axle assemblies are in part mirror images of the rear ones. It will be understood that each axle supports a wheel at each end. Also, the assembly as illustrated, uses an underslung arrangement, but it can readily be adapted to an overslung construction.

The overall assembly to suspend the frame 20 onto an axle housing 29 comprises a torque beam 32 here attached at its forward end to the frame by a resilient bushing assembly 35 and connected at its rear end to a lower or buffer beam 37 by two such bushings 38 and 39. The lower beam 37 is in turn welded to the axle housing 28 by means to be described. It also supports at its rear portion an air spring 40 that is attached to the frame. A shock absorber 43 is swiveled to the lower beam 37, at 44, and is also swiveled to the frame of the vehicle at 45. Thus, the frame is connected to the opposite ends of the torque beam 32 and the lower beam 37, respectively, which beams are secured together through the bushings 38 and 39, and the whole structure is connected to the axle housing 28 by having the lower beam 37 welded to that housing.

Figure 6:
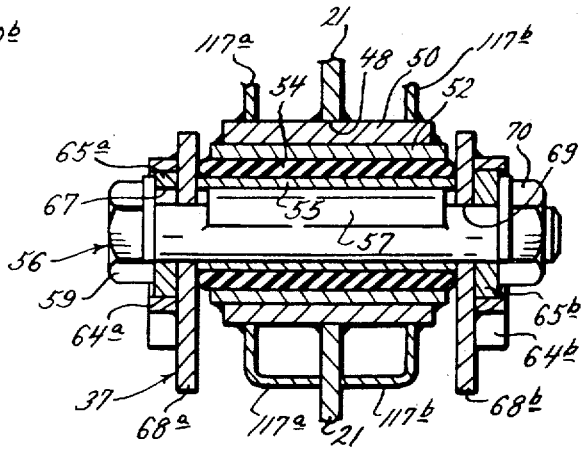
FIG. 6 is an enlarged transverse section through the torque beam bushing taken on the line 6—6 of FIG. 1.

The mounting of the bushing assembly 35 to the frame 20 is as follows. A hole 48 is cut in the web 21 to receive the bushing assembly 35 (FIG. 6). This assembly 35 includes a cylindrical sleeve 50 passing through the hole 48, and welded to the web 21. The bushing assembly comprises another cylindrical sleeve 52 concentrically fitted into the sleeve 50, within which is mounted a cylindrical rubber or other elastomeric member 54; and inside that is an additional cylindrical sleeve 55. The sleeve 55 is mounted over an eccentric bolt 56 that has an eccentric portion 57 that appears in FIG. 6. This eccentric portion of the bolt 56 may have the form shown in FIG. 14 of U.S. Pat. No. 3,510,149, secured to the surface of the otherwise cylindrical bolt.

When the foregoing bushing assembly 35 is properly positioned, four welds are placed around each end, joining the sleeve 50 and the cylinder 52.

The attachment of the torque beam and the bushing is made as follows. A bolt 56 is inserted (from the left in FIG. 6) through a non-circular, here rectangular, frame 64a that is an extension fixed to the end of one sidearm 68a of the torque beam, as will appear. A non-circular plate 65a, shaped to fit inside the frame 64a, is located on the bolt before the eccentric portion is mounted thereon.

Passing them through an opening 67 in the plate 65a, and a similar opening in the torque bar arm 68a, the bolt 56 is pushed through the sleeve 55 that has a diameter equal to the larger diameter of the eccentric mounting on the bolt. At its other end, the reduced portion of the bolt 56 passes through the opening 69 in the other side arm **68*b* of the torque bar 32** and the opening in the plate 65b in the frame 64b, and projecting thus it receives the nut 70.

As will be evident, turning of the bolt 56 about its axis displaces the eccentric portion 57. Since the bushing assembly 35 is welded to the frame, the displacement caused by the turning of the eccentric displaces the arms 68a and 68b, and hence the entire torque bar 32, in a generally-forward or rearward direction, depending on the direction of rotation of the bolt.

The side arms 68a and 68b of the torque beam have side reinforcing plates 71a and 71b welded to them and to their end frames 64a and 64b. The beams 68a and 68b, after reaching beyond the frame flange 23, converge (FIG. 2) until they reach parallel sections, 68c and 68d. respectively, that extend rearwardly to the bonded rubber bushing assembly 38, that extends across through both. They are also connected by a bottom plate 75 and a bottom plate 76. They are also connected by an upper plate 77 and other upper plates 78 that are continuations of 77. The overall purpose is to create a sturdy box-like beam structure that can straddle the frame 20, and yet fit between the side arms of the lower beam 37.

The lower beam 37, which is swiveled by bonded rubber bushing assembly 38 (U.S. Pat. No. 3,801,086) to the torque beam 32, extends approximately midway forwardly adjacent the torque beam 32. At its forward end it is connected by a bonded rubber bushing 39 (see U.S. Pat. No. 3,801,086) to the torque beam 32, that is notched to receive the bonded bushing 39. The busing 39 is welded to the torque beam between the bottom plates 75 and 76. The bonded bushing 38 and 39 secure the two beams 32 and 37 together.

Lower beam 37 consists of two U-channelled side arms 85a and 85b that are joined together by the two bushings 38 and 39. The arms 85a and 85a have angular plates 87a and 87b welded to them and projecting upwardly above them. The plates 87a and 87jb are recessed to fit approximately halfway around, and are welded to, the axle casing 28. There are also plates 90a and 90b forward of the housing that are welded to and outside of the plates 87a and 87b. Between the plates 90a and 90b and inside the plates 87a and 87b, an intermediate vertical plate 91 is welded. There is also a plate 92 welded between the plates 87a and 87b to add to the rigidity of the construction.

The structure at the rear side of the axle is similar with outer plates 95a and 95b, and intermediate a vertical plate 96, all welded to the angular vertical plates 87a and 87b and to the axle housing 28. There is also a reinforcing plate 98 between the two angular plates 87a and 87b. Thus, the axle housing 28 is adapted to be welded into the semi-circular cut-out in the plates 87a and 87b, and to be welded to the plates 90a and 90b, 95a and 95b, 91 and 96.

Figure 4:
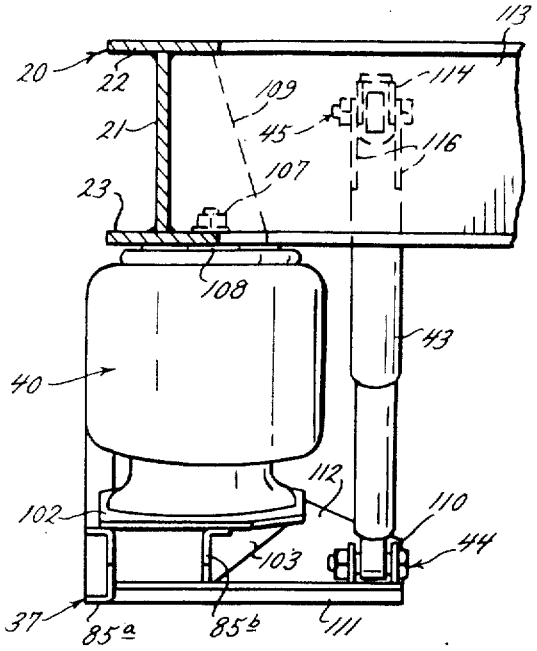
FIG. 4 is a rear view taken from the right end on the line 4—4 of FIG. 1.
Figure 5:
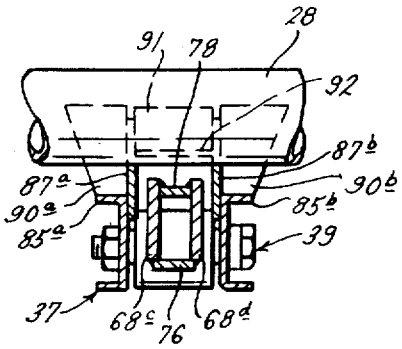
FIG. 5 is a section on the line 5—5 of FIG. 1.

To the rear of the foregoing, a mounting to hold the air spring 40 onto the lower beam 37 includes a base plate 102 supported across the U-members 85a and 85b as shown particularly in FIGS. 1 and 4. A gusset 103 is welded to the parts to give support to the lateral extension of the base plate 102. Cap screws or the like 105 hold the bottom of the air spring onto the plate 102. At the top the air spring is secured by bolts 106 and 107 to a plate 108 and to the bottom flange 23 of the frame 21. Another gusset 109 aids in supporting the plate 108.

One end of the conventional shock absorber 43 is secured by a pivot bracket 110 to a base plate 111 that is welded across the bottom of the channels 85a and 85b as shown particularly in FIG. 4. A plate 112 is welded to the channel 85b and the bracket 111 to support the latter. The other end of this shock absorber is rockably mounted on a cross beam member 113 of the vehicle frame by a bracket 114 that extends outwardly and forwardly from the cross beam. Gussets 116 support the bracket 114. The attachment of the shock absorber is made by a bushing assembly that can be tightened to alter the torque resistance of any rocking action of the shock absorber, which of course will occur when the air spring is compressed or elongated vertically.

In setting the equipment into place, the torque beam 32, the lower beam 37, the air spring 40, with their associated parts, are pre-assembled together. Then measurements are made to locate the bolt holes for the air spring 40, and the hole for the bushing assembly 35. The sleeve 50 of the bushing 35 is then welded in place to the flange 21, as shown in FIG. 6. The bushing assembly including the sleeve 52, the rubber member 54 and the sleeve 55 are then put in place, aligned, and the sleeve 52 is welded to the sleeve 50 at four points around each end.

The bolt 56 with the plate 65a already in place on it, is then passed through the frame 64a and the member 68a of the torque beam, thence through the sleeve 55 and through the other plate 68b of the torque beam, the plate 65b and the frame 64b, and finally the nut 70 which is tightened. This disposes the square plates 65a and 65b within the square frames 64a and 64b and these parts are held non-rotatably together. The bracing frames 117a and 117b may be added to the assembly within the frame to stabilize the assembly.

The bracket 114 having been welded onto the cross frame 113, the air spring 40 is attached to the flange 23 of the frame by the bolts 106 and 107, and a shock absorber 43, already usually attached to its lower end, is attached by the pivot bolt 45 to the bracket 114 on the frame.

The plates 87a and 87b then embrace the axle housing 28 and are welded to it, as shown. Also, the plates 90a, 90b and 92, as well as the plates 95a, 96b and 98 are all welded to the axle housing, as shown.

The order in which the foregoing parts are assembled onto the vehicle is not necessarily critical. It will be understood that there will be one such assembly at each end of each axle.

The next stage of assembly is to tighten the nut 70 of the bushing 35 and the corresponding nuts of the bushings 38 and 39 to a torque of 1100 foot pounds, and to tighten the shock absorber nut on connection 44, and the one at the connection 45, each to a torque of 150 foot pounds.

At this time, the arrow appearing on the end of the bolt 56 of the bushing 35 must be at the twelve o'clock position. Then to align the axle, the nut 70 is loosened and the bolt head 59 is turned counterclockwise or clockwise in the direction the axle has to be moved to obtain perfect alignment. It will be understood that the adjustment on the opposite end of the axle housing can be adjusted cooperatively to obtain the appropriate alignment of the axle. The maximum movement forward or backward is to the nine o'clock or the three o'clock position. When the appropriate final alignment is obtained, the nuts 70 are retightened to set the torque at 1100 pounds. Then the clamping plates 65a and 65b are welded to the torque beam assembly 64a, 68a and 64b and 68b.

With the adjustments completed, and these parts thus secured, the U-shaped locking plates are fitted over the bolt head 59 and the nut 70 of the bolt 56, and are welded to the adjacent plates 65a and 65b.

OPERATION

As the vehicle is loaded, or as the wheels pass over a hump, the frame and the axle housing 28 are compressed toward each other. Considering it as if the wheel rides onto a hump, the lower, or buffer, beam 37 is raised to compress the air spring 40, as well as to pivot the torque beam 32 to pivot about the bushing 35. This applies compression or torque about all three bushings 35, 38 and 39, and they all apply resilient resistance thereto.

When only one side of the vehicle rides over a hump, the resilient bushings 38 and 39 can flex angulary, or transversely to their axes, accommodating the angular effect on the axle housing 28 without severe strain on the torque beam that is mounted onto the frame, the bushings 38 and 39 permitting such action. The narrow shape of the lower beam disposed between the arms 85a and 85b provides this action. The torque beam is essentially not permitted to rock longitudinally about its resilient bushing, owing to the close fit of its sleeve between the arms 68a and 68b. Hence the displacement vertically of only one wheel can rock the lower beam without rocking the torque beam. As a result, the axle 28 may rock about a fore-and-aft axis without rocking the vehicle frame and body. The shock absorber is mounted to the frame 20 by a resilient bushing, so that it may accommodate the foregoing movements.

The parts of this equipment not otherwise indicated are usually made of steel.

There are various changes and modifications which may be made to applicant's invention as would be apparent to those skilled in the art. However, any of these changes or modifications are included in the teaching of the applicant's disclosure and he intends that his invention be limited only by the scope of the claims as appended hereto.

What I claim is:

1. In a vehicle suspension assembly for a vehicle having a frame: a torque beam *having first and second ends* adapted to be secured to the vehicle frame at a first point; a spring also adapted to be secured to the vehicle frame at a second point spaced from the first point; a first resilient bushing having an outer sleeve adapted to be firmly secured *directly* to the frame; an inner sleeve, an elastomeric sleeve between the outer and inner sleeve; a pivot extending through the inner sleeve, and initially rotatable therein; the torque beam having spaced arms at its *first* end, one extending across each end of the inner sleeve, means for non-rotatably connecting the said arms to the pivot, so as to restrain rocking movement of the arms relatively to the inner sleeve; the torque beam arms extending from the first point toward the second point, and [converting] *converging* to a closer relation *at the second end*; means connecting the two arms to form a box-like torque beam; a buffer beam; [a second resilient bushing] *means* connecting the *second* end of the torque beam [near the second point] to the buffer beam [and another third resilient bushing connecting the two beams between the first and second points]; the spring being attached to the buffer beam beyond the torque beam, and means to connect the buffer beam [between its resilient bushings] to an axle housing.

2. In the assembly of claim 1: the means for connecting the torque beam arms to the pivot comprising a noncircular end frame secured to the end of each arm adjacent the ends of the pivot, a plate on each end of the pivot complementary in shape to the non-circular end frame, means to make the plates non-rotatable with respect to the pivot.

3. In the assembly of claim 2: the end frame and the complementary plates being rectangular, and the pivot having eccentric means cooperative with the plates and the bushings to enable the torque beam to be displaced lengthwise relation to the bushings.

4. In the assembly of claim 1: the buffer beam having two laterally spaced arms, one on each side of the coverged arms of the torque beam [, the resilient bushings connecting the two beams having outer sleeve secured across and to the two arms of the torque beam and pivots inside the sleeve].

[5. In the assembly of claim 4: each of the second and third bushings connecting the two beams having an elastomeric insert between the outer sleeve and its pivot.]

[6. In the assembly of claim 4: three bushing pivots being bolts whereby the torque resistance can be adjusted and set.]

[7. In the assembly of claim 1: a shock absorber connected to the buffer beam beyond the second bushing.]

8. In a vehicle suspension for a vehicle having *an axle and* a frame *with a wide portion and a narrow portion wherein the wide portion is between the axle and the narrow portion*; a torque beam adapted to be attached to the vehicle frame at a first point, the end of the torque beam being bifurcated to enable it to receive *the wide portion of* the frame between its bifurcations [at said first point], means to connect the torque beam to the *wide portion of the* frame between the bifurcations; a bolster beam adapted to be connected to the vehicle axle, means to connect the bolster beam to the frame at a second point on the frame spaced from said first point, the bolster beam comprising two spaced side members secured firmly together in spaced relationship; the torque beam inward of the bifurcated end being narrowed and received between the said side members of the bolster beam, and means [attached] *attaching* the bolster and torque beam together.

*9. In a vehicle having a frame including a longitudinal side rail which has vertically spaced generally longitudinally extending sections and a drop section connected between and joining the vertically spaced sections, the side rail including the drop section having generally a vertical web and a flange extending transverse to the web, the flange on the drop section being positioned between the web and the axle, a suspension having beam means connected to an axle, spring means connected between the beam means and the frame, a mounting assembly for pivotally supporting the suspension directly from the web at the drop section comprising a first hollow sleeve, means to rigidly connect the first hollow sleeve directly to the web at the drop section in transverse orientation relative thereto, a hollow elastomeric member within the hollow sleeve having transverse ends, a cylindrical member within the hollow elastomeric member, the cylindrical member having transverse ends and being at least as long as the hollow elastomeric member to expose its ends without interference from the elastomeric member, the cylindrical member also being long enough to locate its ends transversely beyond the flange, a pair of longitudinally extending, transversely*

*spaced arms supported from the beam means and straddling the flange, and means to join the respective arms directly to the respective end of the cylindrical member for unitary movement with the cylindrical member, the spring means being spaced from the cylindrical member.*

*10. The combination of claim 9 wherein the side rail comprises an I beam including the generally vertical web and a top flange, the transverse flange comprising a bottom flange on the I beam, the means to connect the first hollow sleeve to the drop section comprising a hole in the web for receiving the first hollow sleeve, and a weld connection between the web and the first hollow sleeve, the space between the arms being greater than the width of the bottom flange.*

*11. The combination of claim 10 including a first reinforcing member welded to the beam and extending between the top and bottom flanges in spaced relation to a first side of the web, a hole in the first reinforcing member for receiving the first hollow sleeve, the first reinforcing member and the first hollow sleeve being welded together.*

*12. The combination of claim 11 including a second reinforcing member welded to the beam and extending between the top and bottom flanges in spaced relation to a second side of the web, a hole in the second reinforcing member for receiving the first hollow sleeve, the second reinforcing member and the first hollow sleeve being welded together.*

*13. The combination of claim 9 wherein the cylindrical member comprises a second hollow sleeve, a bolt journalled in the arms, the bolt having an eccentric shank located within the second hollow sleeve, the means to join the respective arms to the respective ends of the cylindrical member comprising a head on one end of the bolt adapted to apply pressure against one arm to bind the one arm against one end of the second hollow sleeve, and a nut threaded onto the other end of the bolt to apply pressure against the other arm to bind the other arm against the other end of the second hollow sleeve, the bolt when the nut is loosened being rotatable within the arms to revolve the eccentric within the second hollow sleeve.*

*14. In a vehicle having a frame including a longitudinal side rail, a suspension having beam means having a first end defined by transversely spaced arms, means spaced from the first end for connecting the beam means to an axle of the vehicle, spring means spaced from the first end and connected between the beam means and the frame, a mounting assembly for pivotally supporting the suspension directly from the side rail to thereby obviate use of a hanger comprising a bushing having an outer sleeve, an inner sleeve, and an elastomeric member therebetween, means to rigidly connect the outer sleeve directly to the side rail, and means to join the inner sleeve at the ends thereof to the respective arms of the first end of the beam means.*

*15. The combination of claim 14 wherein the axle is between the first end and the spring means.*

*16. The combination of claim 14 wherein the means to join the inner sleeve to the arms comprising means to clamp the arms to the ends of the inner sleeve.*

*17. The combination of claim 16 wherein the means to clamp comprises a bolt having a head on one end for bearing against one arm and a nut threadable onto the other end of the bolt for bearing against the other arm.*

*18. The combination of claim 14 including a hole through the side rail for receiving the outer sleeve, the means to connect the outer sleeve to the rail comprising a weld between the rail and the outer sleeve.*

*19. The combination of claim 14 including an intermediate sleeve between the outer sleeve and the elastomeric member, the outer sleeve and the intermediate sleeve being welded together.*

* * * * *